United States Patent
Gallagher et al.

(10) Patent No.: US 9,992,480 B1
(45) Date of Patent: Jun. 5, 2018

(54) APPARATUS AND METHODS RELATED TO USING MIRRORS TO CAPTURE, BY A CAMERA OF A ROBOT, IMAGES THAT CAPTURE PORTIONS OF AN ENVIRONMENT FROM MULTIPLE VANTAGES

(71) Applicant: X Development LLC, Mountain View, CA (US)

(72) Inventors: Garratt Gallagher, Oakland, CA (US); Cedric Cagniart, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 189 days.

(21) Appl. No.: 15/158,448

(22) Filed: May 18, 2016

(51) Int. Cl.
| | |
|---|---|
| H04N 13/02 | (2006.01) |
| H04N 7/18 | (2006.01) |
| H04N 5/335 | (2011.01) |
| G05D 1/02 | (2006.01) |
| H04N 13/00 | (2018.01) |

(52) U.S. Cl.
CPC ....... *H04N 13/0278* (2013.01); *G05D 1/0251* (2013.01); *H04N 5/335* (2013.01); *H04N 7/18* (2013.01); *H04N 2013/0081* (2013.01)

(58) Field of Classification Search
CPC .. G05D 1/0251; H04N 13/0278; H04N 5/335; H04N 7/18; H04N 2013/0081
See application file for complete search history.

(56) References Cited

U.S. PATENT DOCUMENTS

| | | |
|---|---|---|
| 8,085,293 B2 | 12/2011 | Brodsky et al. |
| 2015/0042765 A1 | 2/2015 | Pfister |
| 2016/0135906 A1* | 5/2016 | Cattin ................ A61C 1/0046 |
| | | 606/130 |

OTHER PUBLICATIONS

Lin, et al. "High Resolution Catadioptric Omni-Directional Stereo Sensor for Robot Vision." In Robotics and Automation, 2003. Proceedings ICRA'03. IEEE International Conference on, vol. 2, pp. 1694-1699.
Lin, et al. "Single Cone Mirror Omni-Directional Stereo." (2001). 11 pages.

* cited by examiner

*Primary Examiner* — Huy T Nguyen
(74) *Attorney, Agent, or Firm* — Middleton Reutlinger

(57) ABSTRACT

Using mirrors to capture, by a camera of a robot, images that capture portions of an environment from multiple vantages. In various implementations, multiple images, that each capture a portion of an environment from a different vantage, may be captured by a camera sensor of a robot via the adjustment of one or more mirrors viewable by the camera sensor—and the multiple images may be captured independent of locomotion of the robot and/or independent of adjusting a camera sensor pose of that camera sensor. One or more processors associated with the robot may utilize the multiple images to determine one or more features about those portions of the environment captured from different vantages in the images.

21 Claims, 11 Drawing Sheets

APPARATUS AND METHODS RELATED TO USING MIRRORS TO CAPTURE, BY A CAMERA OF A ROBOT, IMAGES THAT CAPTURE PORTIONS OF AN ENVIRONMENT FROM MULTIPLE VANTAGES

BACKGROUND

Cameras (e.g., monographic and/or stereographic cameras) are utilized by robots for a variety of purposes. For example, features determined based on images captured by cameras may be utilized for mapping environments, object detection, object pose estimation, obstacle avoidance, robot localization, etc. In many situations, it may be desirable to capture images of various portions of an environment from more than one vantage. For example, to determine the pose (position and orientation) of an object in an environment it may be desirable to capture images of the object from multiple vantages and determine the three-dimensional (3D) location of one or more points on the surface of that object. Also, for example, to determine one or more features of an environment that may be beneficial to utilize as landmarks in mapping of an environment, it may be desirable to determine that those features are visible and/or consistent from multiple vantages.

Stereographic cameras provide the ability to capture images of portions of an environment from multiple vantages and may be utilized, for example, to determine the 3D location of surfaces in the environment. For example, stereographic cameras typically include two cameras, or a single camera and multiple mirrors, to enable the capture of two images from two different vantages. However, in stereographic cameras used in robotics, the vantages of the two images are typically fixed relative to one another throughout use of the stereographic cameras. For example, in a two camera stereographic camera system the distance between two cameras (the baseline), and the pan and the tilt of the two cameras are typically set at the time of manufacture and remain fixed throughout operation.

Mobile robots also provide the ability to capture images of portions of an environment from multiple vantages. For example, a mobile robot can navigate throughout an environment to thereby change the vantage of a camera of the mobile robot (e.g., since the camera moves with the robot) and enable images of a portion of the environment to be captured from multiple vantages. However, reliance solely on navigation of the robot may present one or more drawbacks. For example, it may be time consuming; localization of the robot (which may be necessary to "localize" images) as it navigates may be difficult, slow, and/or inaccurate; navigation may not be desirable or possible when the robot is engaged in certain other tasks; and/or there are certain areas to which the robot can't navigate. Additional and/or alternative drawbacks of these and/or other approaches may be presented.

SUMMARY

This specification is directed to methods and apparatus related to using mirrors to capture, by a camera of a robot, images that capture portions of an environment from multiple vantages. In various implementations of the methods and apparatus described herein, multiple images, that each capture a portion of an environment from a different vantage, may be captured by a camera sensor of a robot via the adjustment of one or more mirrors viewable by the camera sensor—and the multiple images may be captured independent of locomotion of the robot and/or independent of adjusting a camera sensor pose of that camera sensor. One or more processors associated with the robot (e.g., on the robot or on a remote computing device in communication with the robot) may utilize the multiple images to determine one or more features about those portions of the environment captured from different vantages in the images. For example, the one or more processors may determine one or more features such as edge features, color features, depth features, etc. The processor(s) may assign the feature(s) to an identifier of the portion of the environment for one or more purposes such as environment mapping (e.g., for determining landmarks to assign to a map of an environment), object detection, object pose estimation, obstacle avoidance, robot localization, robot navigation, etc.

In some implementations, one or more adjustable mirrors may be provided in a camera in combination with a camera sensor of the camera. Through adjustment of the adjustable mirror(s) of the camera, the vantage of images captured by the camera sensor may be adjusted. As one example, one or more adjustable mirrors may be provided in a stereographic camera in combination with at least one of the camera sensors of the stereographic camera—and the pose of the mirror(s) at any given time may dictate the vantage of at least portions of an image captured at that given time.

In some implementations, techniques described herein may be implemented using a mirror provided on an adjustable arm of a robot. For example, the mirror may be attached to a location of an adjustable arm where an end effector is typically attached, or the end effector may "pick up" the mirror, or the mirror may be attached to another location of the adjustable arm. When attached to the robot arm, the mirror may have a fixed attachment to the robot arm (i.e., the mirror pose can't be adjusted unless the robot arm pose is adjusted) or may have an adjustable attachment to the robot arm (i.e., the mirror pose can be adjusted independent of adjustment of the robot arm pose).

In some implementations, a method is provided that includes capturing, by a camera sensor of a robot, a first image that captures at least a portion of an environment of the robot. The portion of the environment is captured in the first image from a first vantage and is captured through reflections of two or more mirrors. The method further includes, subsequent to capturing the first image, adjusting a mirror pose of at least a first mirror of the two or more mirrors. The adjusting is to an adjusted pose and the adjusting occurs independent of locomotion of the robot and independent of adjusting a camera sensor pose of the camera sensor. The method further includes, capturing, by the camera sensor of the robot when the first mirror is at the adjusted pose, a second image that captures at least the portion of the environment from a second vantage. The capturing from the second vantage is a result of adjusting the first mirror pose to the adjusted pose. The method further includes determining at least one feature of the portion of the environment of the robot based on both the first image and the second image; and assigning, in one or more computer readable media, the feature to an identifier of the portion of the environment.

This method and other implementations of technology disclosed herein may each optionally include one or more of the following features.

In some implementations, the at least one feature is a depth feature and determining the depth feature includes: determining a first depth value based on one or more pixels of the first image and based on one or more corresponding pixels of a third image, the third image being captured at or near a first time at which the first image was captured; determining a second depth value based on one or more pixels of the second image and based on one or more corresponding pixels of a fourth image, the fourth image being captured at or near a second time at which the second image was captured; and determining the depth feature based on the first depth value and the second depth value. In some of those implementations, the corresponding pixels of the third image and the corresponding pixels of the fourth image are captured by a second camera sensor of the robot without mirror reflection. In some of those implementations, the third image and the fourth image are both captured at a third vantage. In some of those implementations where the third image and the fourth image are both captured at the third vantage, determining the depth feature based on the first depth value and the second depth value includes: determining at least one initial depth value based on at least one of the first depth value and the second depth value; determining a first weight for the first depth value based on a first accuracy measure of the combination of the first vantage and the third vantage for the initial depth value; determining a second weight for the second depth value based on a second accuracy measure of the combination of the second vantage and the third vantage for the initial depth value; and determining the depth value based on the first depth value and the first weight, and based on the second depth value and the second weight.

In some implementations, adjusting the mirror pose includes: adjusting the mirror pose of the first mirror to the adjusted pose; and adjusting a second mirror pose of a second mirror, of the two or more mirrors, to a second adjusted pose. In some of those implementations, the second mirror is coupled to an adjustable arm of the robot, and adjusting the second mirror pose of the second mirror to the second adjusted pose includes: actuating one or more actuators of the adjustable arm that dictate an adjustable arm pose of the adjustable arm and that dictate the second mirror pose of the second mirror.

In some implementations, the method further includes: determining the adjusted pose of the first mirror and the second adjusted pose of the second mirror; determining the second vantage based on: the adjusted pose, the second adjusted pose, and the camera sensor pose at the time the second image was captured; and determining the feature of the portion of the environment based on the second vantage. In some of those implementations, determining the adjusted pose of the first mirror is based on sensor data from one or more sensors that indicate one or more positions of one or more actuators that dictate the mirror pose of the first mirror. In some version of those implementations, the first mirror is coupled to an adjustable arm of the robot, the actuators dictate an adjustable arm pose of the adjustable arm and dictate the first mirror pose of the first mirror, and adjusting the first mirror pose of the first mirror to the adjusted pose includes actuating the actuators of the adjustable arm.

In some implementations, the method further includes determining, prior to adjusting the first mirror pose of the first mirror to the adjusted pose, that the adjusted pose enables capturing of the second image from the second vantage. In some of those implementations, the adjusting the mirror pose to the adjusted pose is in response to determining that the adjusted pose enables capturing of the second image from the second vantage.

In some implementations, the at least one feature of the portion of the environment includes at least one of an edge feature, a color feature, a corner feature, a blob feature, and a depth feature.

In some implementations, a method is provided that includes capturing, by a camera sensor of a robot, a first image. The first image captures at least a portion of an environment of the robot from a first vantage. The method further includes, subsequent to capturing the first image, adjusting a camera sensor pose of the camera sensor or a mirror pose of at least one mirror in the field of view of the camera sensor. The adjusting is to an adjusted pose and the adjusting occurs independent of locomotion of the robot. The method further includes capturing, by the camera sensor of the robot when the camera sensor or the mirror are at the adjusted pose, a second image that captures at least the portion of the environment from a second vantage. The capturing from the second vantage is a result of adjusting the camera pose or the mirror pose to the adjusted pose. The method further includes determining at least one feature of the portion of the environment of the robot based on both the first image and the second image; and assigning, in one or more computer readable media, the feature to an identifier of the portion of the environment.

This method and other implementations of technology disclosed herein may each optionally include one or more of the following features.

In some implementations, adjusting the camera pose or the mirror pose to the adjusted pose includes adjusting the mirror pose of the mirror in the field of view of the camera sensor. In some given implementations of those implementations, the mirror in the field of view of the camera sensor is coupled to an adjustable arm of the robot, and adjusting the mirror pose of the mirror to the adjusted pose includes: actuating one or more actuators of the adjustable arm that dictate an adjustable arm pose of the adjustable arm and that dictate the mirror pose of the mirror. In some of those given implementations, the method further includes: determining the adjusted pose of the mirror; determining the second vantage based on the adjusted pose of the mirror and based on the camera sensor pose at a time the second image was captured; and determining the feature of the portion of the environment based on the second vantage. In some of those given implementations, the method further includes: determining the adjusted pose of the mirror; determining that the portion of the environment present in the first image is also present in the second image based on the adjusted pose of the mirror; and determining the feature of the portion of the environment of the robot based on both the first image and the second image is based on determining that the portion of the environment is present in the first image and the second image. Determining the adjusted pose of the mirror may be based on, for example, sensor data from one or more sensors that indicate positions of the actuators that dictate the mirror pose of the mirror.

In some implementations, the identifier of the portion of the environment identifies a location of the portion of the environment in a map of the environment. In some implementations, the at least one feature is a depth feature. In some of those implementations, determining the depth feature includes: determining a first depth value based on one or more pixels of the first image and based on one or more corresponding pixels of a third image, the third image being captured at or near a first time at which the first image was captured; determining a second depth value based on one or more pixels of the second image and based on one or more corresponding pixels of a fourth image, the fourth image being captured at or near a second time at which the second image was captured; and determining the depth feature based on the first depth value and the second depth value.

In some implementations, a method is provided that includes capturing, by a camera sensor of a robot, a first image that captures at least a portion of an environment of the robot from a first vantage. The method further includes, subsequent to capturing the first image, adjusting a mirror to an adjusted mirror pose. The mirror is coupled to an adjustable arm of the robot and the mirror at the adjusted mirror pose is in the field of view of the camera sensor. Adjusting the mirror pose to the adjusted mirror pose includes: actuating one or more actuators of the adjustable arm that dictate an adjustable arm pose of the adjustable arm and that dictate the mirror pose of the mirror. The method further includes capturing, by the camera sensor of the robot when the mirror is at the adjusted pose, a second image that captures, through the mirror, at least the portion of the environment from a second vantage. The method further includes determining at least one feature of the portion of the environment of the robot based on both the first image and the second image; and assigning, in one or more computer readable media, the feature to an identifier of the portion of the environment.

Other implementations may include one or more non-transitory computer readable storage media storing instructions executable by a processor (e.g., a central processing unit (CPU) or graphics processing unit (GPU)) to perform a method such as one or more of the methods described above. Yet another implementation may include a system of one or more computers and/or one or more robots that include one or more processors operable to execute stored instructions to perform a method such as one or more (e.g., all) aspects of one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

In some implementations of the technology described herein, multiple images, that each capture a portion of an environment from a different vantage, may be captured by a camera sensor of a robot via the adjustment of one or more mirrors viewable by the camera sensor. One or more processors associated with the robot (e.g., on the robot or on a remote computing device in communication with the robot) may utilize the multiple images to determine one or more features about those portions of the environment captured from different vantages in the images. For example, the one or more processors may determine one or more features such as edge features, color features, depth features, line features, corner features, blob features, etc. The processor(s) may assign the feature(s) to an identifier of the portion of the environment for one or more purposes such as mapping of an environment (e.g., for determining landmarks to assign to a map of an environment), object detection, object pose estimation, obstacle avoidance, robot localization, robot navigation, etc.

Some implementations of the technology described herein enable multiple images of a portion of an environment to be captured from multiple vantages without necessitating locomotion of the robot and/or decreasing the extent of locomotion of the robot. In some of those implementations, the pose of the robot may be localized, that robot pose may remain stationary during the capture of images from multiple vantages, and that robot pose may optionally be utilized in determining various features based on the images captured at that pose. This may reduce the extent of error in feature determination that is attributable to inaccurate localization of the robot. For example, by keeping the robot "still" longer while capturing multiple images, the accuracy of the robot localizations may be increased and/or the number of different robot localizations utilized in determining various features based on multiple images may be decreased. Moreover, reducing the extent of locomotion of the robot may achieve other advantages, such as decreased computational and/or human resources needed to navigate the robot, increased temporal efficiency, etc. Some implementations additionally and/or alternatively enable multiple images of a portion of an environment to be captured from multiple vantages without necessitating adjusting the pose of one or more camera sensors and/or adjusting the pose of a housing that houses one or more camera sensors. Additional description of these and other implementations of the technology is provided below.

Figure 1:
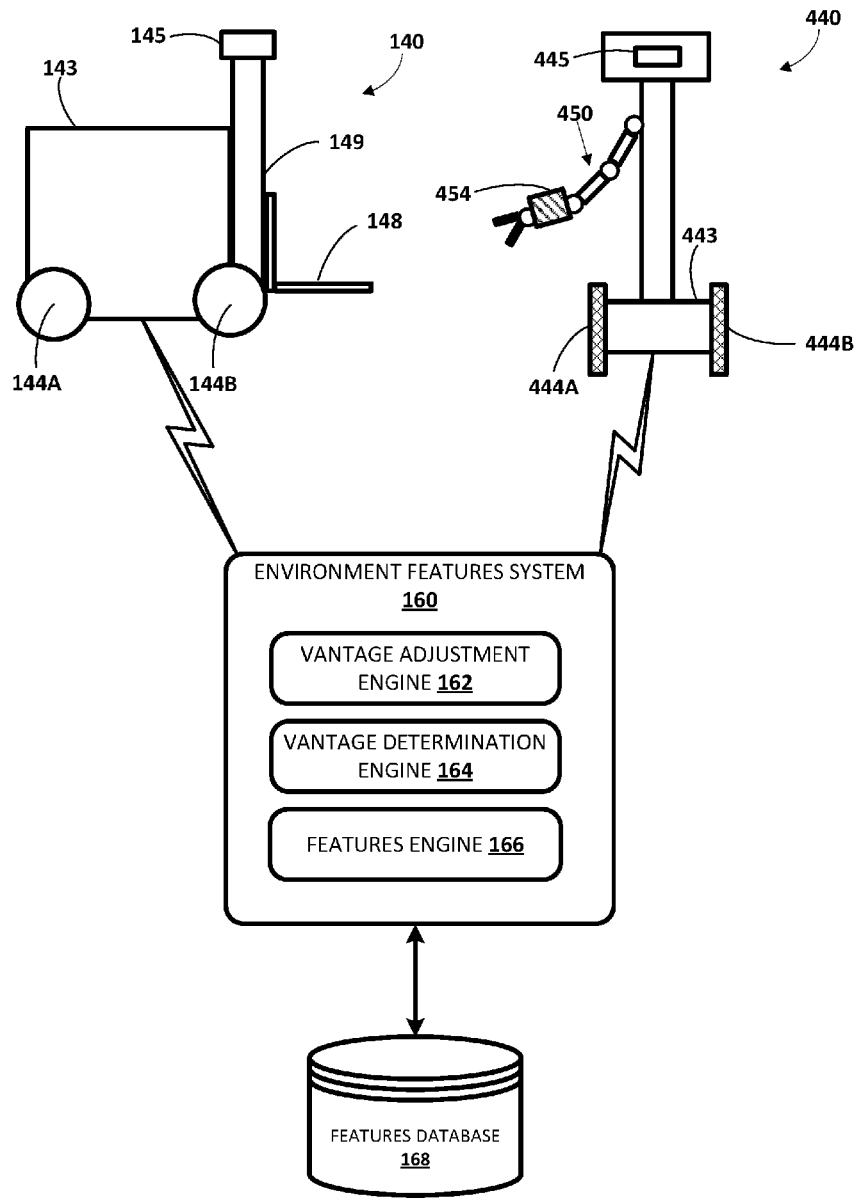
FIG. 1 illustrates an example environment in which mirrors can be used to capture, by a camera sensor of a robot, images that capture portions of an environment from multiple vantages—and in which those images can be used to determine one or more features of the environment.

FIG. 1 illustrates an example environment in which mirrors can be used to capture, by a camera of a robot (e.g., a camera of robot 140, robot 440, and/or other robot), images that capture portions of an environment from multiple vantages—and in which those images can be used to determine one or more features of the environment.

The environment includes robot 140, environment features system 160, and robot 440. In FIG. 1 environment features system 160 is illustrated as separate from, but in communication with (e.g., network communication and/or direct communication), both of robots 140 and 440. In some implementations, all or aspects of environment features system 160 may be implemented on robot 140 and/or robot 440 (e.g., via one or more processors of robots 140 and 440). For example, robots 140 and 440 may each include an instance of the environment features system 160, with that instance optionally tailored to the configuration of the robot. In some implementations, all or aspects of environment features system 160 may be implemented on one or more computer systems that are separate from, but in network communication with, robots 140 and/or 440. Moreover, in some of those implementations, each of the robots 140 and 440 may be in communication with their own dedicated instance of the environment features system 160.

The environment features system 160 includes a vantage adjustment engine 162, a vantage determination engine 164, and a features engine 166. The vantage adjustment engine 162 adjusts the vantage of at least portions of images captured by a camera sensor of a robot and adjusts the vantage based at least in part on adjustment of a mirror pose of one or more mirrors of the robot. The vantage determination engine 164 determines, for each of one or more images captured by a camera sensor of a robot, a vantage of at least a portion of the image. The engine 164 may determine the vantage based on the mirror pose of one or more mirrors at the time the image was captured and/or based on one or more poses of other components of the robot. The features engine 166 determines at least one feature for portions of an environment based on images that capture those portions from multiple vantages. The features engine 166 may store determined features in one or more computer-readable media (transitory or non-transitory) that are on or remote from a robot, such as in features database 168. Additional description of the environment features system 160 and the engines 162, 164, and 166 is provided herein.

The robot 140 is a pallet jack robot that includes a plurality of forks 148 coupled to an elevator 149. The elevator 149 raises and lowers the forks 148 to enable pallets and/or other objects to be lifted off of the ground and repositioned. The robot 140 also includes a base 143 with four wheels (wheels 144A and 144B are illustrated) provided thereon for locomotion of the robot 140. The base 143 may include, for example, one or more motors for driving corresponding wheels to achieve a desired direction, velocity, and/or acceleration of movement for the robot 140.

In some implementations, the wheels of the robot 140 may be controlled autonomously and/or semi-autonomously and/or the elevator 149 may be controlled autonomously and/or semi-autonomously. For example, at least some of the time the robot 140 may position itself autonomously based at least in part on one or more features of an environment of the robot, such as features determined based on multiple images from multiple vantages as described herein. The robot 140 also includes one or more processors that, for example: provide control commands to actuators (e.g., servo motors) and/or other operational components of the robot 140; implement one or more aspects of environment features system 160 (e.g., at least aspects of the vantage adjustment engine 162); and/or determine control commands to adjust one or more operational components of the robot 140 based on features of an environment determined by features engine 166.

The robot 140 also includes various sensors such as camera sensors of camera 145. Camera 145 is a stereographic camera and is illustrated in more detail in FIGS. 2A-2C, which are described in more detail below.

The robot 440 includes adjustable robot arm 450 with an end effector that takes the form of a gripper with two opposing actuable members. The robot 440 also includes a base 443 with wheels 444A and 444B provided on opposed sides thereof for locomotion of the robot 440. The base 443 may include, for example, one or more motors for driving corresponding wheels 444A and 444B to achieve a desired direction, velocity, and/or acceleration of movement for the robot 440.

Robot 440 may operate autonomously and/or semi-autonomously at least part of the time. During at least some of that time, the autonomous and/or semi-autonomous operation of the robot 440 may be based at least in part on one or more features of an environment of the robot, such as features determined based on multiple images from multiple vantages as described herein. For example, the robot 440 may control the wheels 444A and/or 444B, the robot arm 450, the end effector of the robot arm 450, and/or other components based on features determined based on multiple images from multiple vantages.

The robot 440 also includes various sensors such as a camera sensor of camera 445. Camera 445 is a monographic camera. The robot 440 also includes a mirror 454 attached to the adjustable robot arm 450 and the pose of the mirror 454 is adjustable through adjustment of the pose of the robot arm 450. As described in more detail herein, the camera sensor of camera 445 can capture multiple images that each capture the mirror 454 at a different pose and that each capture, through the mirror 454, a portion of an environment from a different vantage. Additional description of the camera 445, the robot arm 450, and the mirror 454 is provided below with respect to FIGS. 4 and 5.

Although particular robots 140 and 440 are illustrated in FIG. 1, additional and/or alternative robots may be utilized, including robots having robot arm forms, robots having a humanoid form, robots having an animal form, other robots that move via one or more wheels (e.g., self-balancing robots), submersible vehicle robots, an unmanned aerial vehicle ("UAV"), and so forth. Also, although a particular end effector is illustrated on adjustable robot arm 450, additional and/or alternative end effectors may be utilized, such as alternative grasping end effectors (e.g., those with more or fewer "digits"/"claws", "ingressive" grasping end effectors, "astrictive" grasping end effectors), drills, brushes, cutting tools, deburring tools, welding torches, and so forth.

Figure 2A:
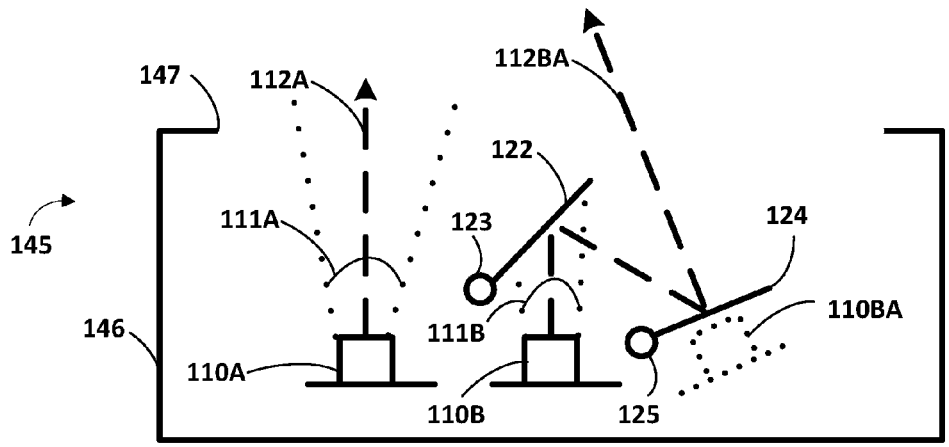
FIG. 2A illustrates an example of a stereographic camera that may be utilized by one of the robots of FIG. 1, with adjustable mirrors of the stereographic camera in a first configuration.
Figure 2B:
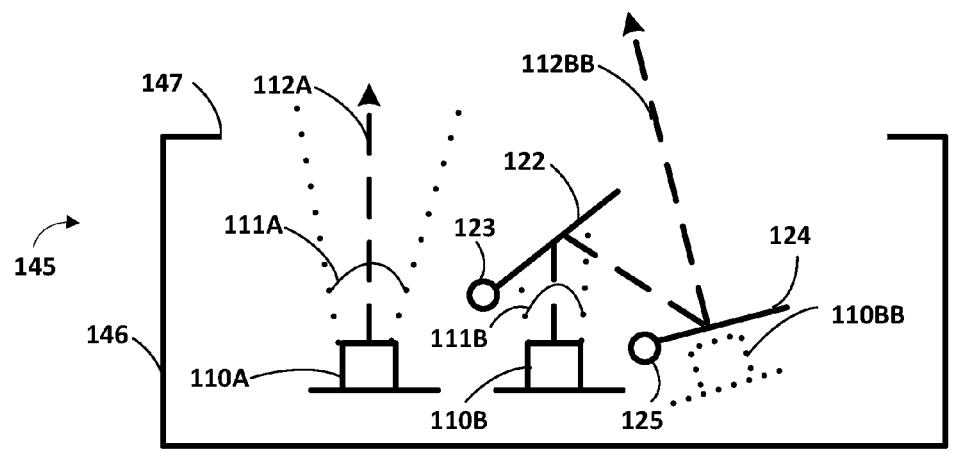
FIG. 2B illustrates the stereographic camera of FIG. 2A, with the adjustable mirrors in a second configuration.
Figure 2C:
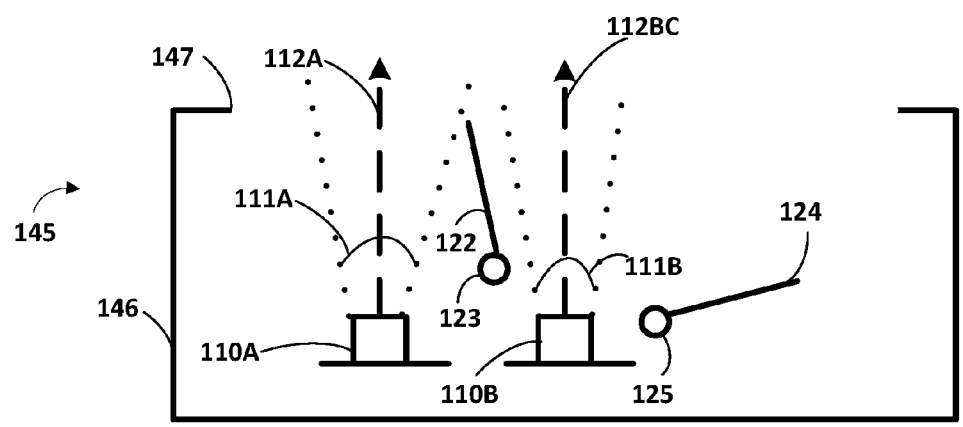
FIG. 2C illustrates the stereographic camera of FIG. 2A, with the adjustable mirrors in a third configuration.

With reference to FIGS. 2A-2C, additional description is provided of stereographic camera 145 of robot 140, and of some implementations of environment features system 160. FIGS. 2A-2C each show a housing 146 of stereographic camera 145 and an opening 147 provided through the housing 146. The opening 147 enables camera sensors 110A, 110B of camera 145 to capture images of an environment external to the housing 146. A transparent or semi-transparent cover may optionally be provided over the opening 147.

The first camera sensor 110A is mounted at a fixed pose relative to the housing 146 and has a field of view 111A directed toward the opening 147. An arrow 112A is provided to give a general indication of a normal of the vantage from which images will be captured by the camera sensor 110A. A second camera sensor 110B is also mounted at a fixed pose relative to the housing 146 and has a field of view 111B that is also directed toward the opening 147. Mirrors 122 and 124 are provided in combination with the second camera sensor 110B. The poses of the mirrors 122, 124 may be actuated by corresponding actuators 123, 125 to adjust the vantage of images captured by the camera sensor 110B. For example, the vantage adjustment engine 162 may provide control commands to actuator 123 and separate control commands to actuator 125 to adjust the mirrors 122, 124 to desired poses. Each of the actuators may be, for example, a servo motor that is rotated in response to provided control commands. The vantage adjustment engine 162 may be implemented, for example, via one or more processors of the camera 145 and/or other processor(s) of the robot 140.

As used herein, a pose of a mirror or other component of a robot specifies both a position and an orientation of the component. In some implementations, the position of the component may be the position of a reference point of the component. In some implementations, the reference point of a component may be a center of mass of the component, though this is not required. The pose of a component may be defined in various manners, such as in joint space and/or in Cartesian/configuration space. A joint space pose of a component may be a vector of values that define the states of each of the operational components of a robot that dictate the position of that component. A Cartesian space pose of a component may utilize coordinates or other values that define all six degrees of freedom of the component relative to a reference frame. Moreover, the pose of a component of a robot may be defined with respect to various reference frames, such as a robot reference frame of a robot (e.g., the pose relative to a reference point of the robot), or a world/map reference frame (e.g., the pose relative to a reference point of a map of the environment or in another reference frame of the environment).

In FIG. 2A, the mirror 122 is adjusted to a first pose and the mirror 124 is adjusted to a second pose. In the first pose of the mirror 122, it is fully within the field of view 111B of the camera sensor 110B. In the first pose of the mirror 122 and the second pose of the mirror 124, the mirror 124 is in the field of view of the mirror 122, and the mirror 122 reflects at least part of the image being reflected by mirror 124. Accordingly, the second camera sensor 110B is capturing at least part of the image being reflected by mirror 124. This is illustrated by virtual camera 110BA that represents the vantage of the image being viewed by the second camera sensor 110B in the configuration of FIG. 2A. In other words, although the camera sensor 110B is at the illustrated position, it captures an image from a vantage indicated by virtual camera 110BA. Arrow 112BA is provided to give a general indication of a normal of the vantage from which images will be captured by the camera sensor 110B, and to give an indication of how the poses of mirrors 122 and 124 dictate that vantage.

In FIG. 2B, the mirror 122 is adjusted to a third pose and the mirror 124 is adjusted to a fourth pose. For example, the vantage adjustment engine 162 may provide control commands to the actuators 123, 125 to adjust the mirrors 122, 124 to the illustrated poses. Due to the adjusted poses of the mirrors 122, 124, the second camera sensor 110B is capturing an image from a different vantage. This is illustrated by virtual camera 110BB that represents the vantage of the image being viewed by the second camera sensor 110B in the configuration of FIG. 2B. Arrow 112BB is provided to give a general indication of a normal of the vantage from which images will be captured by the camera sensor 110B, and to give an indication of how the poses of mirrors 122 and 124 dictate that vantage.

In FIG. 2C, the mirror 122 is adjusted to a pose where it is no longer in the field of view of the second camera sensor 110B. For example, the vantage adjustment engine 162 may provide control commands to the actuator 123 to adjust the mirror 122 to the illustrated pose. Accordingly, in the configuration of FIG. 2C, the mirrors 122, 124 are not affecting the image captured by the second camera sensor 110B and the second camera sensor captures an image from the vantage of the camera sensor 110B. An arrow 112C is provided to give a general indication of the direction of the portions of the environment that will be captured by the camera sensor 110A in the configuration of FIG. 2C.

In some implementations, vantage adjustment engine 162 may transition the mirrors 122, 124 through the poses of FIGS. 2A-2C, and/or through additional unillustrated poses, at a relatively high rate of speed to enable camera sensor 110B to capture multiple images that capture portions of the environment of the robot 140 from multiple vantages. For example, a first group of the multiple images may include a first image that captures a first portion of the environment from a first vantage, a second image that captures the first portion from a second vantage, etc. Also, for example, a second group of the multiple images may include a third image that captures a second portion of the environment from a third vantage, a fourth image that captures the second portion of the environment from a fourth vantage, etc. One or more of the images of the first group and the second group may optionally overlap. For example, the first image of the first group may also be included in the second group since it may also capture the second portion of the environment from the first vantage.

In some implementations, the vantage adjustment engine 162 may transition the mirrors through a group of predefined "pose pairs" (i.e., each pose pair is a pose for the mirror 122 and a pose for the mirror 124) that are determined to be valid pose pairs that each enable the camera sensor 110B to capture at least a portion of the environment. In some of those implementations, the vantage adjustment engine 162 may transition through the predefined pose pairs based on values stored in memory or other computer-readable media accessible by the vantage adjustment engine 162, such as values that define the pose pairs, that define actuator positions for the pose pairs, and/or that define control commands to provide to actuators to achieve the pose pairs.

The vantage determination engine 164 may determine, for each of the images captured by the camera sensor 110B, a vantage for that image. The vantage determination engine 164 may assign the vantage of each image to the image in memory and/or other computer-readable medium (e.g., in features database 168). In some implementations, the vantage determination engine 164 may determine the vantage for a given pose pair of the mirrors 122 and 124 based on that vantage being predefined for the given pose pair (or predefined for other value(s) indicating the pose pair). For example, the vantages for the pose pairs may be indicated by values stored in memory or other computer-readable media accessible by the vantage determination engine 164. The vantage determination engine 164 may correlate a given vantage with a given image based on coordination with the vantage adjustment engine 162.

The vantage determination engine 164 may determine a vantage relative to any one of a variety of reference frames, such as a world/map frame, a robot frame, etc. For example, the vantage in a world frame for any images captured by a camera sensor without use of an adjustable mirror may be based on the pose of that camera sensor in the world frame. The pose of that camera sensor may be determined based on the pose of the robot in the world frame (e.g., determined based on localization techniques) and based on a known pose of the camera sensor relative to the robot (e.g., its pose in a robot frame).

In some implementations, the vantage determination engine 164 may actively determine the vantage for a given pose pair (e.g., "on the fly", or "pre-execution" and store them). The vantage determination engine 164 may utilize one or more of various techniques to determine a vantage for a given image. For example, for images captured by a camera sensor with the use of adjustable mirror(s), the poses and/or other parameters of those adjustable mirror(s) at the time the images were captured can be considered in determining the vantages of those images. As one example, the parameters of each mirror (e.g., size, reflective properties) may be known (e.g., stored in memory). Additionally, the pose of each mirror for an image can be determined, for example, based on the positions readings for the actuator(s) that control the mirror. Given the parameters and pose of each mirror, and the pose of the camera sensor (e.g., determined as described above), the vantage determination engine 164 can determine the vantage from which the image was captured. In other words, the camera pose of the "virtual camera" created by the mirror(s) can be resolved and the camera pose of the virtual camera utilized as the vantage for the image. In some implementations, the vantage determination engine 164 may perform one or more aspects of the method 800 of FIG. 8 in determining the vantage for an image.

The features engine 166 may utilize images that capture the same portion of the environment (i.e., one or more particular points in the environment) from multiple vantages to determine various features of those portions. In some implementations, the features engine 166 may assign a given feature to an identifier of its corresponding portion of the environment, such as an identifier of that portion in a map of the environment. In determining a feature of a portion of the environment, the features engine 166 may utilize images of that portion that are captured by camera sensor 110б, and optionally one or more images of that portion that are captured by camera sensor 110A. The features engine 166 utilizes the determined vantage for each of the images to determine which portions of the environment are captured in the image.

In some implementations, a feature determined by features engine 166 may be a color feature, an edge feature, a texture feature, a line feature, a corner feature, a blob feature, or other visible feature of a portion of an environment. The features engine 166 may utilize a plurality of the images that capture that portion of the environment from multiple vantages to determine the feature. In some of those implementations, the features engine 166 utilizes the plurality of the images to determine whether that feature should be assigned to an identifier of the portion. For example, a feature may be assigned only if it is present in at least a threshold quantity of the images from multiple vantages and/or only if it has at least a threshold level of consistency in one or more of the images from multiple vantages. For instance, assume a painting in an environment has a very distinct feature when viewed from a vantage that is "straight on", but that feature is not consistent at different vantages and/or is not visible at all when viewed at different vantages (e.g., it is occluded by another object in the environment). The images that capture the painting from multiple vantages may be utilized to determine such a feature is not a feature that should be assigned to that portion of the environment in a map and/or elsewhere, and/or that if it is assigned, it should be given "less weight" as a feature.

In some implementations, the features engine 166 may transform one or more portions of captured images in determining features based on those images. Transforming an image may include, for example, flipping, rotating, skewing, and/or scaling the image and may be performed by the features engine 166 prior to, or during, determining feature(s) based on the image. As one example, when utilizing an image captured at least in part through one or more mirrors, the features engine 166 may transform those portions of the image captured through the one or more mirrors. For instance, the features engine 166 may flip, rotate, skew, and/or scale those portions of an image captured through a mirror. The transformation applied by the features engine 166 may be based on a determined vantage for that portion of the image and may effectively transform that portion of the image to a reference vantage.

In some implementations, the features engine 166 may utilize multiple image pairs capturing one or more of the same points from different vantages to determine a depth value feature for a 3D coordinate or other identifier of those points. Each of the utilized image pairs may optionally be captured at or near the same time. For instance, a first image of the image pair may be one captured by camera sensor 110A from a first vantage of camera sensor 110A and a second image of the image pair may be one captured by camera sensor 110E3 from a second vantage (corresponding to a particular adjustment of mirrors 122, 124). In some of those implementations, the features engine 166 may determine a depth value based on each of the image pairs (e.g., using existing stereo techniques to calculate 3D points), and a final depth value may be determined based on a plurality of those determined depth values. For example, the final depth value may be based on a mean, median, and/or other statistical function of the individual depth values.

In some implementations of determining a depth value for a given point, the features engine 166 may, in determining the depth value, assign weights to each of multiple individual depth values utilized to determine the depth value. The weights may be based on determined accuracies for those individual depth values, where those accuracies are based on the vantages utilized to determine the individual depth values. In other words, some vantage pairs are more accurate for a given depth value than are other vantage pairs (while those other vantage pairs may be more accurate for other depth values). The accuracy of a vantage pair may be based on features of the vantage pair such as the baseline of that vantage pair (the distance between the positions of the two vantages), the orientations of the two vantages, etc.

The features engine 166 may determine the weights, for example, based on a mapping (e.g., in memory or other computer-readable media) that maps weights for each of a plurality of distances to vantage pairs and/or to feature(s) of vantage pairs. For example, the weights may range from 0 to 1 and for a first vantage pair it may have a weight of 0.75 for distances of 0-5 feet, a weight of 0.8 for distances of 5-10 feet, a weight of 1.0 for distances of 10-12 feet, a weight of 0.9 for distances of 12-15 feet, etc. The distance utilized to determine the appropriate weight for a vantage pair may be the individual distance determined based on the vantage pair and/or based on one or more of the other individual distances determined based on other vantage pairs. The weights and the individual distances may be utilized to determine a final depth value. For example, the final depth value may be a weighted average of the individual depth values. In some implementations, the features engine 166 may perform one or more aspects of the method 900 of FIG. 9 in determining the depth value for a point.

Although FIGS. 2A-2C depict a particular example of a camera that may be utilized according to implementations described herein, multiple variations are contemplated. For example, in some implementations, a utilized camera may include only a single camera sensor, only a single mirror, different arrangements of camera sensor(s) and/or mirror(s), camera sensors with adjustable poses, different types of mirrors (e.g., concave, convex), etc.

Figure 3A:
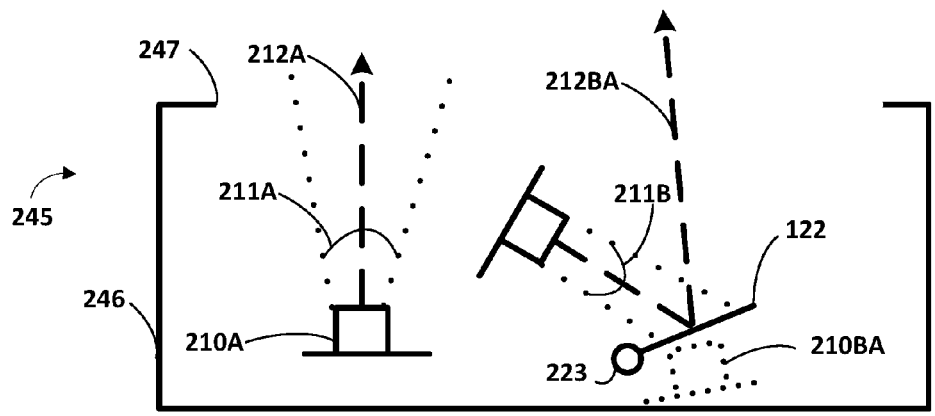
FIG. 3A illustrates another example of a stereographic camera that may be utilized by one of the robots of FIG. 1, with adjustable mirrors of the stereographic camera in a first configuration.
Figure 3B:
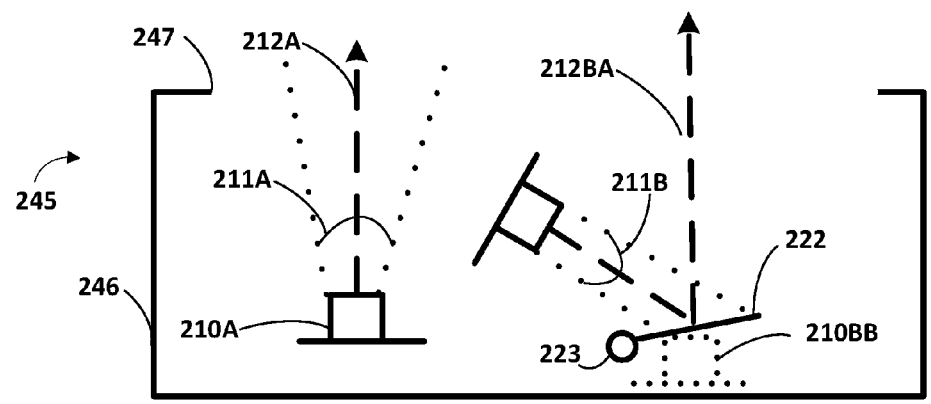
FIG. 3B illustrates the stereographic camera of FIG. 3A, with the adjustable mirrors in a second configuration.

FIGS. 3A and 3B present one example of one variation of a camera. FIGS. 3A and 3B each show a housing 246 of stereographic camera 245 and an opening 247 provided through the housing 146. The first camera sensor 210A is mounted at a fixed pose relative to the housing 146 and has a field of view 211A directed toward the opening 247. An arrow 212A is provided to give a general indication of a normal of the vantage from which images will be captured by the camera sensor 210A.

A second camera sensor 210B is also mounted at a fixed pose relative to the housing 246 and has a field of view 211B that is directed away from the opening 247. Mirror 222 is provided in combination with the second camera sensor 210B. The pose of the mirrors 222 may be actuated by actuator 223 to adjust the vantage of images captured by the camera sensor 210B. For example, the vantage adjustment engine 162 may provide control commands to actuator 223 to adjust the mirrors 222 to a desired pose.

In FIG. 3A, the mirror 222 is adjusted to a first pose. In the first pose of the mirror 222, it is fully within the field of view 211B of the camera sensor 210B. Accordingly, the second camera sensor 210B is capturing at least part of the image being reflected by mirror 222. This is illustrated by virtual camera 210BA that represents the vantage of the image being viewed by the second camera sensor 210B in the configuration of FIG. 3A. Arrow 212BA is provided to give a general indication of a normal of the vantage from which images will be captured by the camera sensor 210B, and to give an indication of how the pose of mirror 122 dictates that vantage.

In FIG. 3B, the mirror 222 is adjusted to a second pose. For example, the vantage adjustment engine 162 may provide control commands to the actuator 223 to adjust the mirror 222 to the illustrated poses. Due to the adjusted pose of the mirror 222 the second camera sensor 210B is capturing an image from a different vantage. This is illustrated by virtual camera 210BB that represents the vantage of the image being viewed by the second camera sensor 210B in the configuration of FIG. 3B. Arrow 212BB is provided to give a general indication of a normal of the vantage from which images will be captured by the camera sensor 210B, and to give an indication of how the pose of mirror 222 dictates that vantage.

Figure 4:
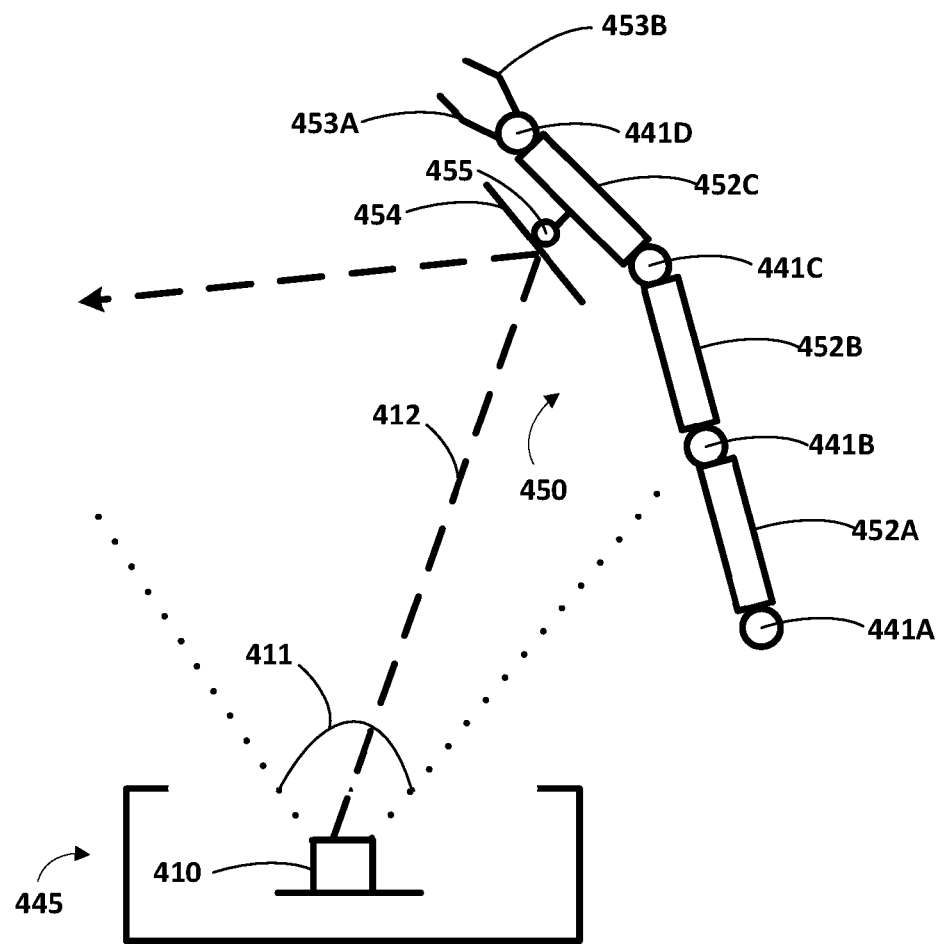
FIG. 4 illustrates an example of a camera and adjustable robot arm with a mirror of one of the robots of FIG. 1.

In some implementations, techniques described herein may be implemented using a mirror provided on an adjustable arm of a robot. FIG. 4 illustrates one example. In FIG. 4, the camera 445 and the adjustable robot arm 450 with the mirror 454 are illustrated. The mirror 454 is within the field of view 411 of a camera sensor 410 of the camera 445 at various poses of the mirror 454, such as the pose illustrated in FIG. 4.

The robot arm 450 includes components 452A-C, actuators 441A-D, and a grasping end effector having two actuable grasping members 453A, 453B. The position of actuators 441A-D may be adjusted (e.g., by vantage adjustment engine 462) and the positions of those actuators dictate the pose of the end effector of the robot arm 450. It will be appreciated from viewing FIG. 4 that the position of actuators 441A-C also affect the pose of the mirror 454. Mirror 454 is attached to the component 452C and has an adjustable attachment to component 452C. The attachment is adjustable by virtue of actuator 455 that enables adjustment of the relative pose between mirror 454 and component 452C. Vantage adjustment engine 462 may also adjust actuator 455 (in combination with and/or independent of adjustment of actuators 441A-C) to dictate the pose of the mirror 454.

Although mirror 454 is illustrated in FIG. 4 with an adjustable attachment to component 452C, in other implementations the mirror 454 may have a fixed attachment to the robot arm 450 (i.e., the mirror pose can't be adjusted unless the robot arm pose is adjusted). Also, although attachment of mirror 454 to a particular component is illustrated in FIG. 4, in other implementations the mirror 454 may be attached to other components of the robot arm 450 (e.g., the mirror may be attached to a location where an end effector is typically attached). Also, in some implementations, the mirror 454 may be non-fixedly attached to the robot arm 450 (e.g., the end effector may "pick up" the mirror). Moreover, although a flat mirror is illustrated in FIG. 4, other types of mirrors may be provided such as concave or convex.

Images may be captured by the camera sensor 410 with the mirror 454 at various poses, wherein multiple of the images capture the same portion of the environment from different vantages. For example, the camera sensor 410 may capture a first image at a first pose of the mirror 454, and a bookshelf in the environment may be present in the mirror 454 in the first image. The camera may then capture a second image at a second pose of the mirror, and the bookshelf in the environment may again be present in the mirror 454 in the second image. Features engine 166 may analyze both images (and optionally additional images) to determine one or more features related to the bookshelf—and those features assigned by the features engine 166 to an identifier of the portion of the environment.

Figure 5:
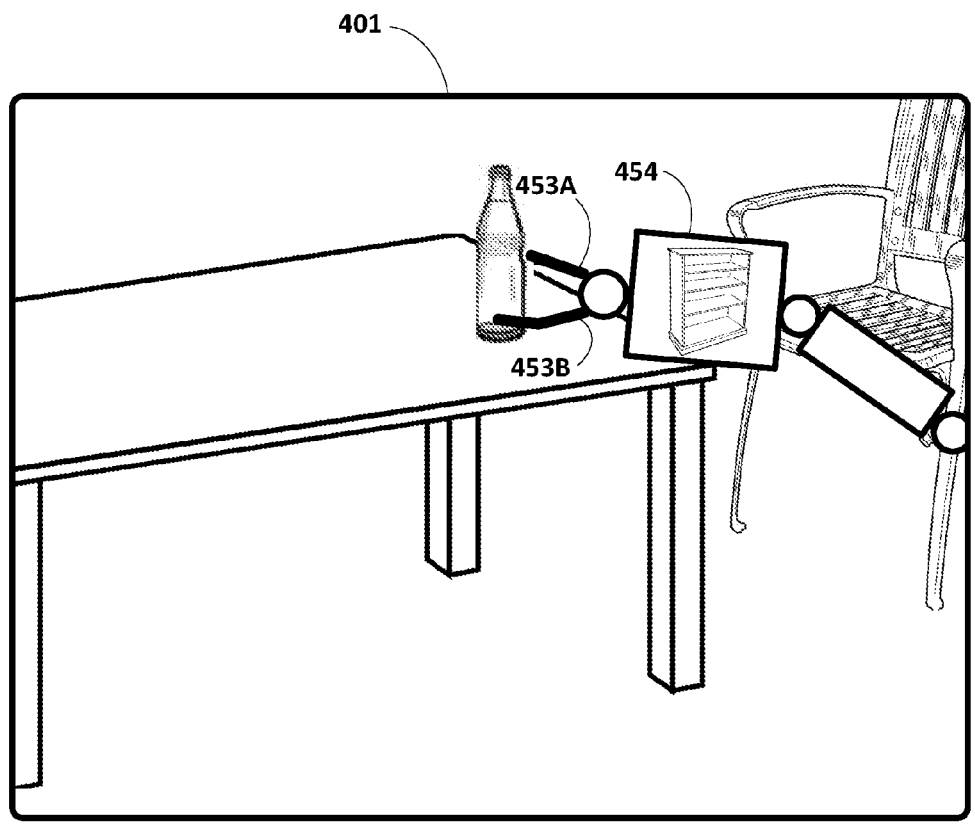
FIG. 5 illustrates an example of an image that may be captured by the camera sensor of the camera of FIG. 4.

FIG. 5 illustrates an example of an image 401 that may be captured by the camera sensor 410 of FIG. 4. The image 401 includes a chair, table, and bottle. The image 401 also includes part of the robot arm 450 while it is engaged in the task of grasping the bottle, as indicated by the actuable grasping member 453A, 453B illustrated near the bottle. The mirror 454 is visible in the image and a bookshelf is present in the mirror 454 in the image 401. As described herein, the vantage of the bookshelf in the image 401 is different from the vantage of other portions of the image 401 as a result of the bookshelf being reflected by the mirror 454. As also described herein, the vantage determination engine 164 may determine the vantage of the portion of the image 401 that captures the bookshelf based on, for example, the pose of the mirror 454 at the time the image 401 was captured. Further, the features engine 166 may determine one or more features for one or more portions of the bookshelf based on the image 401 and based on the determined vantage of the bookshelf in the image 401.

Various techniques may be utilized to analyze images captured by camera sensor 410 to determine features of portions of the environment present in the mirror 454 in those images. For example, the vantage determination engine 164 may utilize various techniques to determine the vantage of portions of images that are captured through the mirror 454. As one example, parameters of the mirror (e.g., size, reflective properties) may be known (e.g., stored in memory). Additionally, the vantage determination engine 164 can determine the pose of the mirror for each of those images based on, for example, the positions of the actuators 551A-C and 555 at the times those images were captured. For example, to determine the pose of the mirror at a given time a given image was captured, the vantage determination engine 164 can apply position sensor readings of the actuators 551A-C and 555 for that given time to a kinematic model of the robot that incorporates the mirror. Further, the vantage determination engine 164 can determine the pose of the camera sensor 410 for the given image, based on, for example: 1) a pose of the robot determined by localizing the robot; and 2) a known pose of the camera relative to the pose of the robot. Given this information, the vantage determination engine 164 can determine the vantage of the portions of the given image that are captured through the mirror 454. In other words, the camera pose of the "virtual camera" created via reflection of the mirror 454 can be resolved and the camera pose of the virtual camera utilized as the vantage for those portions of the environment visible in the mirror 454 of the given image.

The vantage determination engine 164 may also determine those portions of an image captured by camera sensor 410 that are captured through the mirror 454. In other words, the vantage determination engine 164 may determine a first group of pixels of an image that are captured through the mirror 454 and determine a second group of the pixels of the image that are not captured through the mirror 454. The vantage determination engine 164 may assign a different vantage to each of the groups. In some implementations, the vantage determination engine 164 determines those portions of an image that are captured through the mirror 454 based on applying object detection (e.g., to detect the mirror 454), edge detection (e.g., the mirror may optionally have a border that helps detect it), and/or other techniques to the image. In some implementations, the vantage determination engine 164 additionally and/or alternatively determines those portions of an image that are captured through the mirror 454 based on the pose of the camera (e.g., determined as described above), the pose of the mirror (e.g., determined as described above), and the known parameters of the mirror (e.g., determined as described above)—to determine which portions of the image will be occupied by the mirror. In other words, the engine 164 may determine the pixels that will be occupied by the mirror 454 in a given image captured at a given time, based on the pose of the camera at the given time, the pose of the mirror at the given time, and the known parameters of the mirror.

In some implementations that implement a mirror on a robot arm, images that capture portions of an environment through the mirror may be obtained while the robot is using the robot arm to engage in various tasks. For example, while the robot is using the robot arm to perform a "pick and place" task, images may be captured that include the mirror in the field of view, and portions of the image that are present in the mirror in those images can be utilized to determine various features as described herein.

In some implementations that implement a mirror on a robot arm, the robot arm may also be moved deliberately to enable viewing of desired portions of the environment via the mirror of the robot arm. For example, a pose of the mirror that will obtain a view of a desired portion of the environment may be determined, and using the kinematic model of the robot, positions of actuators (that control the pose of the mirror) can be determined that achieve that pose. Control commands can be provided to the actuators to adjust the mirror to that pose and images captured while the mirror is at that pose.

Figures 6A, 6B:
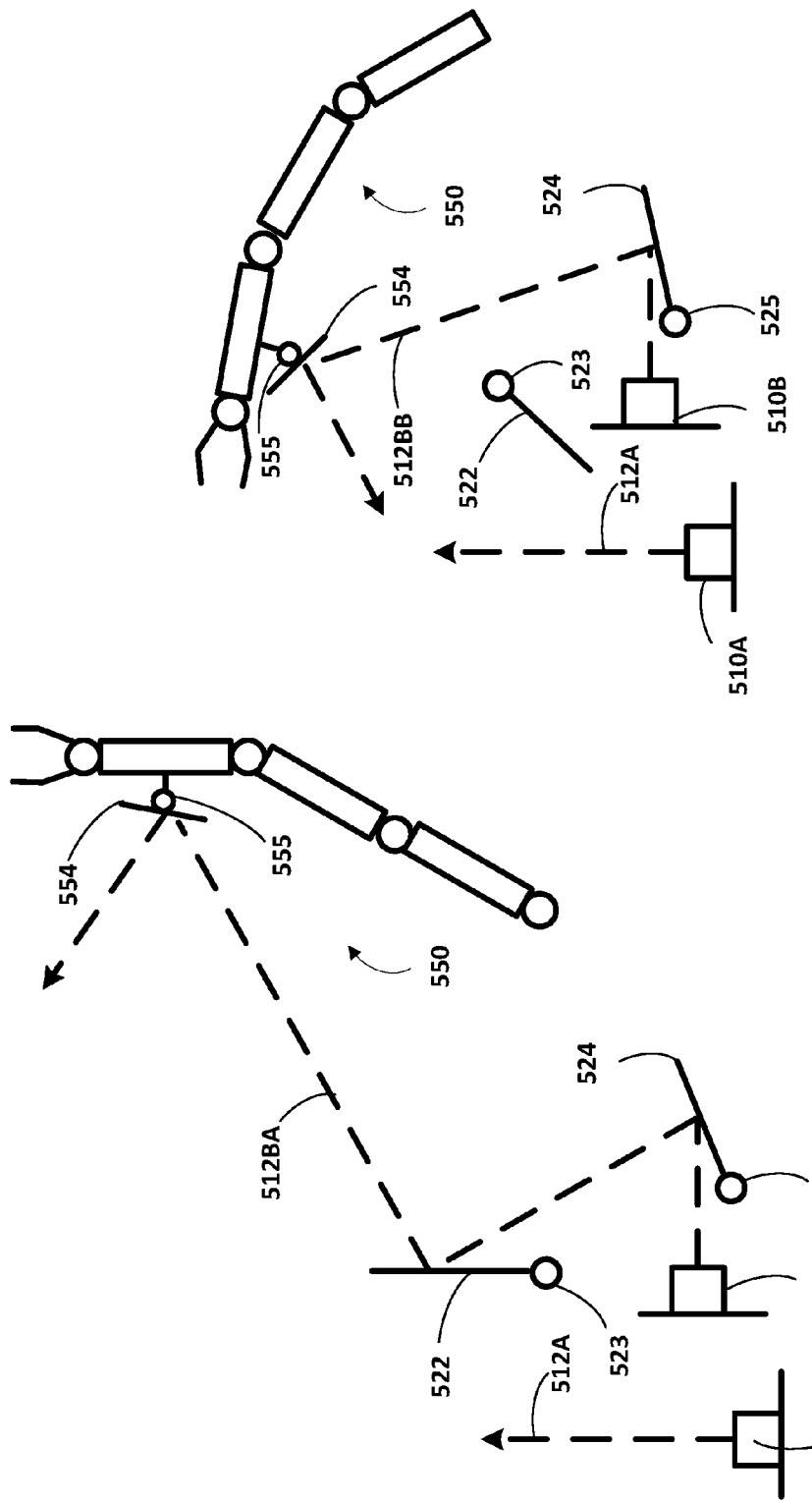
FIG. 6A illustrates another example of a camera and adjustable robot arm with a mirror, with adjustable mirrors of the camera and the adjustable arm in a first configuration.
FIG. 6B illustrates the camera and adjustable robot arm of FIG. 6A in a second configuration.

In some implementations, one or more camera sensors may be adjustable and/or provided in conjunction with adjustable mirrors to ensure the mirror of the robot arm is captured by the camera sensors and/or to generate yet additional vantages. For example, FIGS. 6A and 6B illustrate an example of a camera and adjustable robot arm 550 with a mirror 554, where the camera includes adjustable mirrors 522 and 524. The adjustable mirrors 522, 524 can be adjusted to enable the camera sensor 510B to capture the mirror 554 at a variety of poses of the mirror 554. Moreover, the adjustable mirrors 522, 524 also influence the vantage of those portions of captured images that capture the mirror 554, and can optionally be adjusted while the mirror 554 is stationary to provide further vantages for various portions of an environment without necessitating adjusting the mirror 554.

In FIGS. 6A and 6B, the camera is a stereographic camera that includes camera sensors 510A and 510B. The camera sensor 510A is mounted at a fixed pose relative to a housing (not illustrated) of the camera and has a field of view that may be directed toward an opening of the housing of the camera. An arrow 512A is provided to give a general indication of a normal of the vantage from which images will be captured by the camera sensor 510A. The camera sensor 510B is also mounted at a fixed pose relative to the housing of the camera and has a field of view that is generally orthogonal to the field of view of the camera sensor 510A. Mirrors 522 and 524 are provided in combination with the camera sensor 510B. The poses of the mirrors 522, 524 may be actuated by corresponding actuators 523, 525 to adjust the vantage of images captured by the camera sensor 510B.

In FIG. 6A, the mirror 522 is adjusted to a first pose and the mirror 524 is adjusted to a second pose. In the second pose of the mirror 524, it is fully within the field of view of the camera sensor 510B. In the second pose of the mirror 524 and the first pose of the mirror 522, the mirror 522 is in the field of view of the mirror 524, and the mirror 524 reflects at least part of the image being reflected by mirror 522. Accordingly, the camera sensor 510B is capturing at least part of the image being reflected by mirror 522. Further, the image being reflected by mirror 522 includes the mirror 554 that is attached to the robot arm 550. Accordingly, at least part of the image captured by camera sensor 510B in the configuration of FIG. 6A will include the mirror 554 and those portions of the image included in the mirror in the image will be from a vantage that is dictated by the poses of the mirrors 522, 524, and 554. This is illustrated by arrow 512BA, which gives a general indication of a normal of the vantage for those portions included in the mirror 554 in images captured by the camera sensor 510B, and gives an indication of how the poses of mirrors 522, 524, and 554 dictate that vantage.

In FIG. 6B, the mirror 522 is adjusted to a third pose and the mirror 524 is adjusted to a fourth pose. The mirror 554 is also adjusted to a pose that is different than its pose of FIG. 6A. The pose of the mirror 554 is adjusted by virtue of adjustment of the robot arm 550, and by virtue of adjustment of the actuator 555 that adjusts the pose of the mirror 554 relative to the robot arm 550. In the pose of the mirror 522 illustrated in FIG. 6B, mirror 522 is no longer influencing the vantage of any portion of an image captured by camera sensor 510B. In the pose of the mirror 524 of FIG. 6B, the mirror 524 is in the field of view of the camera sensor 510B and the image being reflected by mirror 524 includes the mirror 554 that is attached to the robot arm 550. Accordingly, at least part of the image captured by camera sensor 510B in the configuration of FIG. 6B will include the mirror 554 and those portions of the image included in the mirror in the image will be from a vantage that is dictated by the poses of the mirrors 524 and 554. This is illustrated by arrow 512BB, which gives a general indication of a normal of the vantage for those portions included in the mirror 554 in images captured by the camera sensor 510B, and gives an indication of how the poses of mirrors 524 and 554 dictate that vantage.

Figure 7:
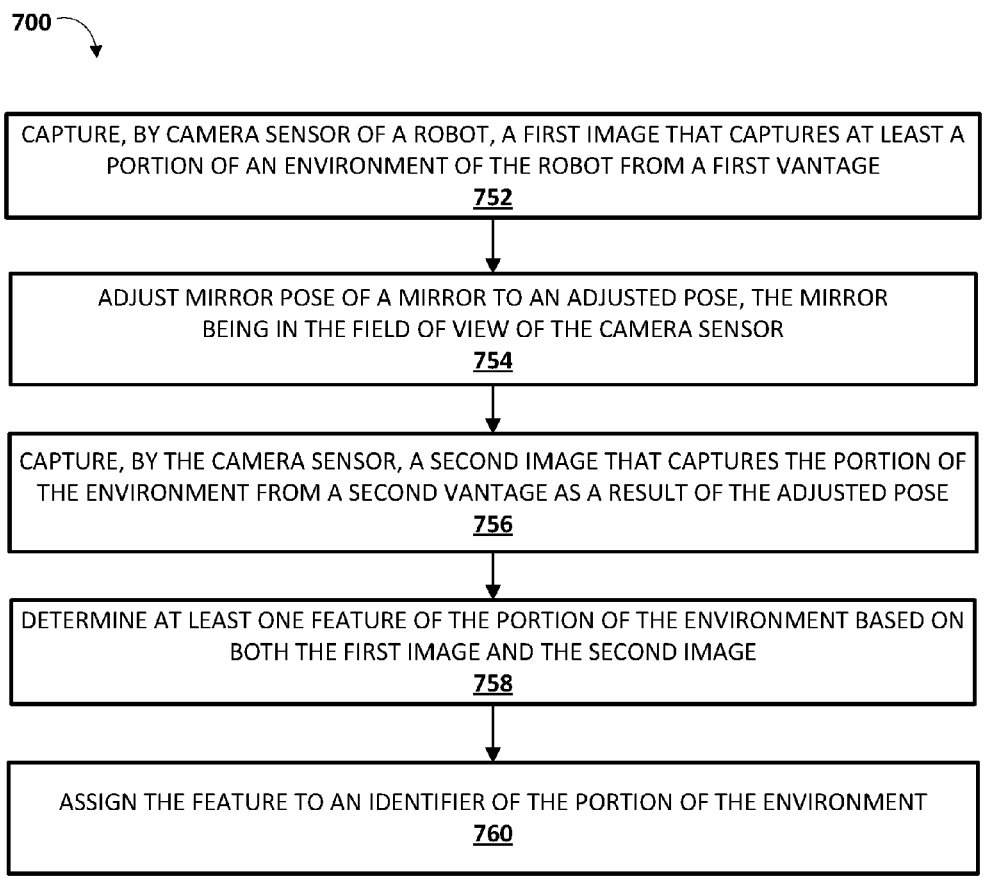
FIG. 7 is a flowchart illustrating an example method of using mirrors to capture images that capture portions of an environment from multiple vantages—and using those images to determine one or more features of the environment.

FIG. 7 is a flowchart illustrating an example method 700 of using mirrors to capture images that capture portions of an environment from multiple vantages—and using those images to determine one or more features of the environment. For convenience, the operations of the flow chart are described with reference to a system that performs the operations. This system may include one or more components of a robot, such as a processor and/or robot control system of robot 140, 440, 1020, and/or other robot; and/or one or more components of computing device(s) that are separate from a robot, such computing device 1110. Moreover, while operations of method 700 are shown in a particular order, this is not meant to be limiting. One or more operations may be reordered, omitted or added.

At block 752, a camera sensor of a robot captures a first image. The first image captures at least a portion of an environment of the robot from a first vantage. In some implementations, the entirety of the first image is captured from the first vantage. In some implementations, only part of the first image is captured from the first vantage. For example, only the part of the first image that captures a mirror on an adjustable arm of the robot may be captured from the first vantage.

At block 754, the system adjusts a mirror pose of a mirror to an adjusted pose. The mirror is in the field of view of the camera sensor. In some implementations, the mirror may be a mirror of a camera that includes the camera sensor. For example, the camera sensor and the camera may both be provide in a housing of the camera. In some implementations, the mirror may be a mirror attached to an adjustable end effector of the robot. In some implementations, the system also adjusts one or more additional mirrors in combination with the adjustment of the mirror pose of the mirror. The one or more additional mirrors may be in the field of view of the mirror that is adjusted to the mirror pose, and may be part of a camera that includes the camera sensor and/or attached to an adjustable end effector of the robot.

At block 756, the camera sensor of the robot captures a second image. As a result of the adjusted mirror pose, the second image captures the portion of the environment from a second vantage. In some implementations the second vantage is the result of the adjusted mirror pose, and the pose of one or more additional mirrors, such as one or more additional mirrors whose poses are optionally adjusted in combination with the mirror. In some implementations, the entirety of the second image is captured from the second vantage. In some implementations, only part of the second image is captured from the second vantage.

At block 758, the system determines at least one feature of the portion of the environment based on both the first image and the second image. For example, the system may determine an edge feature, color feature, line feature, corner feature, blob feature, depth feature, and/or other feature of the portion of the environment. In some implementations, the system may utilize the first image and the second image to determine whether a feature should be assigned to the portion of the environment and/or what weight it should be given in an assignment to the portion of the environment.

At block 760, the system assigns the determined feature to an identifier of the portion of the environment. For example, the system may assign the feature to an identifier of its corresponding portion of the environment, such as an identifier of that portion in a map of the environment. In some implementations, the system may optionally operate the robot and/or additional robots based on the feature and based on the assignment of the feature to the identifier.

Figure 8:
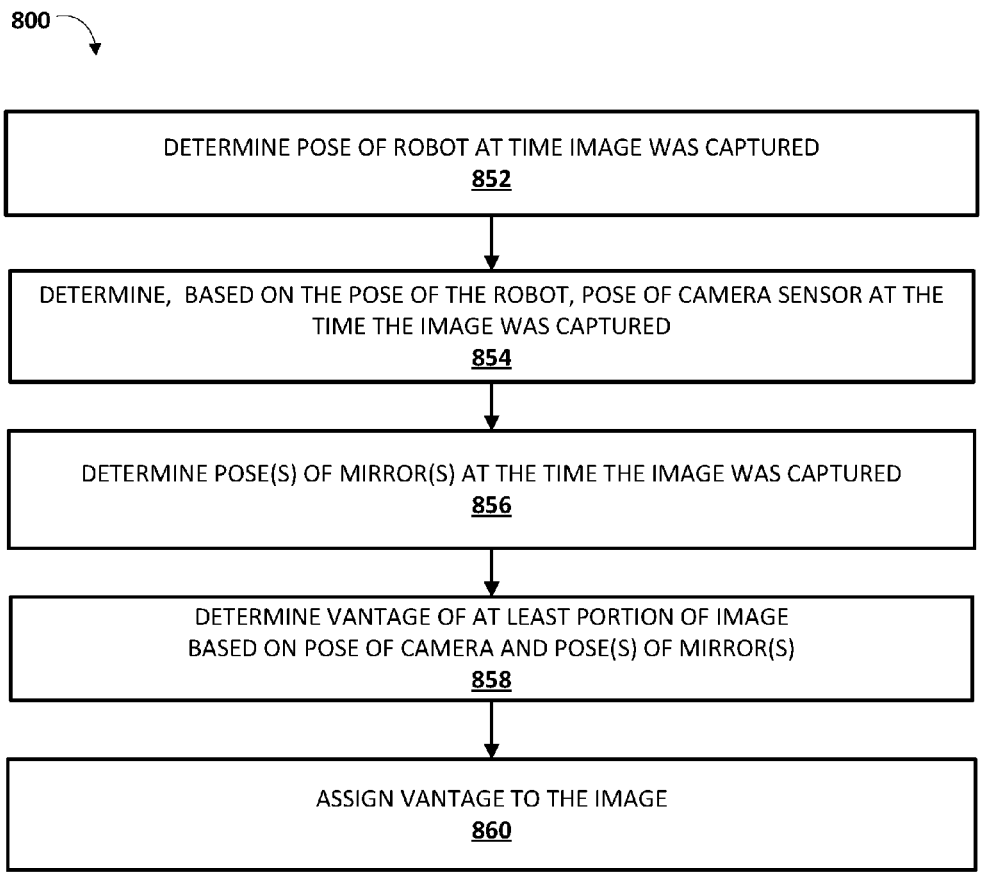
FIG. 8 is a flowchart illustrating an example method of determining a vantage of at least a portion of an image captured via one or more adjustable mirrors.

FIG. 8 is a flowchart illustrating an example method 800 of determining a vantage of at least a portion of an image captured via one or more adjustable mirrors. For convenience, the operations of the flow chart are described with reference to a system that performs the operations. This system may include one or more components of a robot, such as a processor and/or robot control system of robot 140, 440, 1020, and/or other robot; and/or one or more components of computing device(s) that are separate from a robot, such computing device 1110. Moreover, while operations of method 800 are shown in a particular order, this is not meant to be limiting. One or more operations may be reordered, omitted or added.

At block 852, the system determines the pose of a robot at the time an image was captured. For example, the system may determine the pose of the robot based on localization of the robot in a reference frame, such as a map frame.

At block 854, the system determines, based on the determined pose of the robot, the pose of a camera sensor at the time the image was captured. For example, the pose of the camera sensor relative to the robot may be known and the system may determine the pose of the robot in the reference frame based on adjusting that pose based on the pose of the robot in the reference frame.

At block 856, the system determines the pose of one or more mirrors at the time the image was captured. For example, the system may determine the pose of the mirrors based on sensor readings from actuator(s) that control the pose of the mirrors and/or based on control commands provided to those actuator(s) (e.g., under the assumption the control commands were implemented). In some implementations where one of the mirrors is attached to an adjustable arm of the robot, the system may determine the pose of that mirror based on applying sensor readings from sensors of actuators that control the adjustable arm to a kinematic model of the robot. In some implementations, the system determines the pose of a mirror relative to the robot and determines the pose of the mirror in the reference frame based on adjusting that pose based on the pose of the robot in the reference frame.

At block 858, the system determines a vantage of at least a portion of the image based on the determined pose of the camera and the determined pose(s) of the mirror(s). For example, for a portion of the image captured by the camera sensor through two mirrors, the system may determine the vantage based on the camera sensor pose and based on the poses of the two mirrors. For instance, the system may apply the poses to one or more optics formulas to determine the effective vantage of that portion of the image.

At block 860, the system assigns the determined vantage to the image. For example, the system may assign the vantage to the image in one more computer-readable media.

Figure 9:
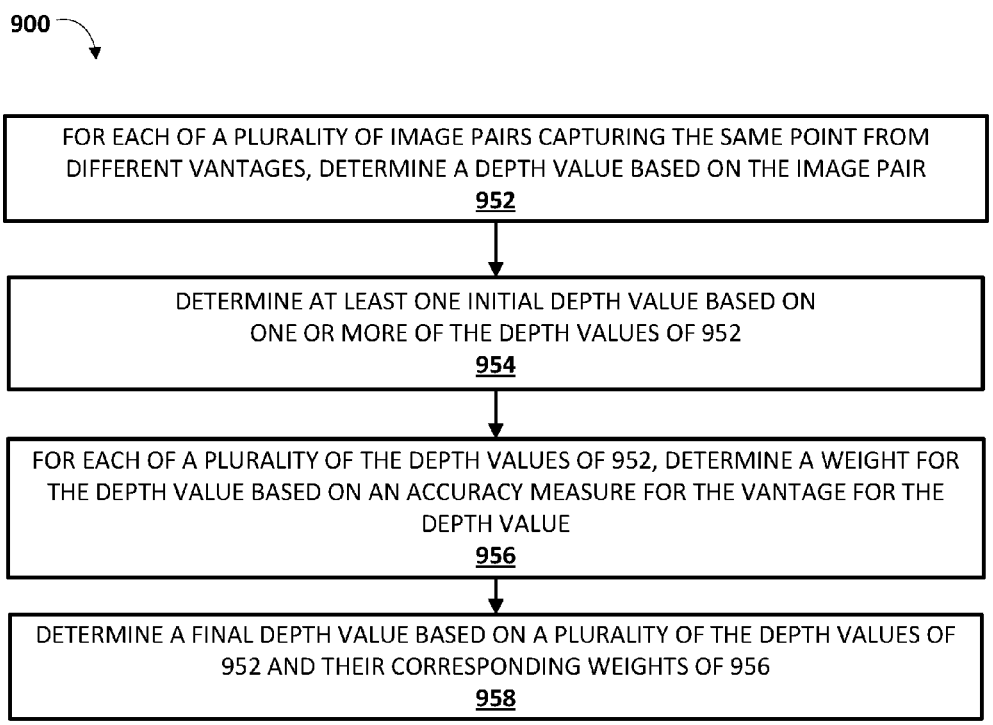
FIG. 9 is a flowchart illustrating an example of determining a final depth value feature of a point based on a plurality of image pairs capturing the point from different vantages.

FIG. 9 is a flowchart illustrating an example of determining a final depth value feature of a point based on a plurality of image pairs capturing the point from different vantages. For convenience, the operations of the flow chart are described with reference to a system that performs the operations. This system may include one or more components of a robot, such as a processor and/or robot control system of robot 140, 440, 1020, and/or other robot; and/or one or more components of computing device(s) that are separate from a robot, such computing device 1110. Moreover, while operations of method 900 are shown in a particular order, this is not meant to be limiting. One or more operations may be reordered, omitted or added.

At block 952, for each of a plurality of image pairs capturing the same point from different vantages, the system determines a depth value for a portion of an environment based on the image pair. A first image of an image pair may be one captured by a camera sensor from a first vantage and a second image of the image pair may be one captured from a second vantage by the same camera sensor or by a different camera sensor. Each of the image pairs may optionally be captured at or near the same time. In some implementations of determining the depth value for an image pair, the portion of the environment is a point in the environment and the system determines a three-dimensional (3D) coordinate for that point (i.e., the depth value is one of the dimensions of the 3D coordinate). In some of those implementations, the 3D coordinate is determined based on the intersection point of a first ray from a first pixel of the first image and a second ray from a corresponding second pixel of the second image (where the rays "project" from the images based on determined geometries between the vantages of the images).

At block 954, the system determines at least one initial depth value based on one or more of the depth values determined at block 952. For example, an initial depth value may be one of the depth value of block 952, or based on a function of one or more of the depth values (e.g., an average of all of the depth values).

At block 956, for each of a plurality of the depth values determined at block 952, the system determines a weight for the depth value based on an accuracy measure for the vantage for the depth value. The weight for a given depth value determined at block 952 may be based on a determined accuracy for the initial depth value, where the accuracy is based on the vantages utilized to determine the given depth value at block 952. In other words, some vantage pairs are more accurate for a given depth value than are other vantage pairs (while those other vantage pairs may be more accurate for other depth values). The accuracy of a vantage pair may be based on features of the vantage pair such as the baseline of that vantage pair (the distance between the positions of the two vantages), the orientations of the two vantages, etc. For example, the weights may range from 0 to 1 and for a first vantage pair it may have a weight of 0.75 for distances of 0-5 feet, a weight of 0.8 for distances of 5-10 feet, a weight of 1.0 for distances of 10-12 feet, a weight of 0.9 for distances of 12-15 feet, etc.

At block 958, the system determines a final depth value based on a plurality of the depth values determined at block 952 and based on their corresponding weights. For example, the system may determine the final depth value based on a weighted average of the individual depth values, where the weighting is based on the weights determined at block 956.

Figure 10:
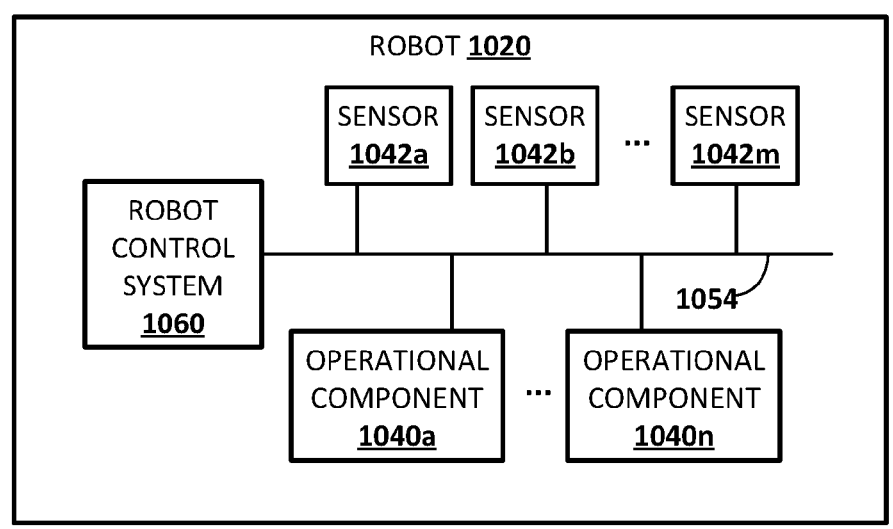
FIG. 10 schematically depicts an example architecture of a robot.

FIG. 10 schematically depicts an example architecture of a robot 1020. The robot 1020 includes a robot control system 1060, one or more operational components 1040a-1040n, and one or more sensors 1042a-1042m. The sensors 1042a-1042m may include, for example, vision sensors (e.g., camera(s), 3D scanners), light sensors, pressure sensors, pressure wave sensors (e.g., microphones), proximity sensors, accelerometers, gyroscopes, thermometers, barometers, and so forth. While sensors 1042a-m are depicted as being integral with robot 1020, this is not meant to be limiting. In some implementations, sensors 1042a-m may be located external to robot 1020, e.g., as standalone units.

Operational components 1040a-1040n may include, for example, one or more end effectors (e.g., grasping end effectors) and/or one or more servo motors or other actuators to effectuate movement of one or more components of the robot. For example, the robot 1020 may have multiple degrees of freedom and each of the actuators may control actuation of the robot 1020 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 1060 may be implemented in one or more processors, such as a CPU, GPU, and/or other controller(s) of the robot 1020. In some implementations, the robot 1020 may comprise a "brain box" that may include all or aspects of the control system 1060. For example, the brain box may provide real time bursts of data to the operational components 1040a-n, with each of the real time bursts comprising a set of one or more control commands that dictate, inter alio, the parameters of motion (if any) for each of one or more of the operational components 1040a-n. In some implementations, the robot control system 1060 may perform one or more aspects of method 700, 800, and/or 900 described herein.

As described herein, in some implementations all or aspects of the control commands generated by control system 1060 may be generated based on one or more features about portions of an environment of the robot 1020, where those features are determined based on multiple images captured from different vantages according to techniques described herein. Moreover, as also described herein, in some implementations the control system 1060 may generate and provide control commands to one or more actuators that cause those actuators to adjust the pose of one or more mirrors, such as mirrors included as part of a camera of the robot 1020 and/or mirror(s) attached to an adjustable robot arm of the robot 1020. Although control system 1060 is illustrated in FIG. 10 as an integral part of the robot 1020, in some implementations, all or aspects of the control system 1060 may be implemented in a component that is separate from, but in communication with, robot 1020. For example, all or aspects of control system 1060 may be implemented on one or more computing devices that are in wired and/or wireless communication with the robot 1020, such as computing device 1110.

Figure 11:
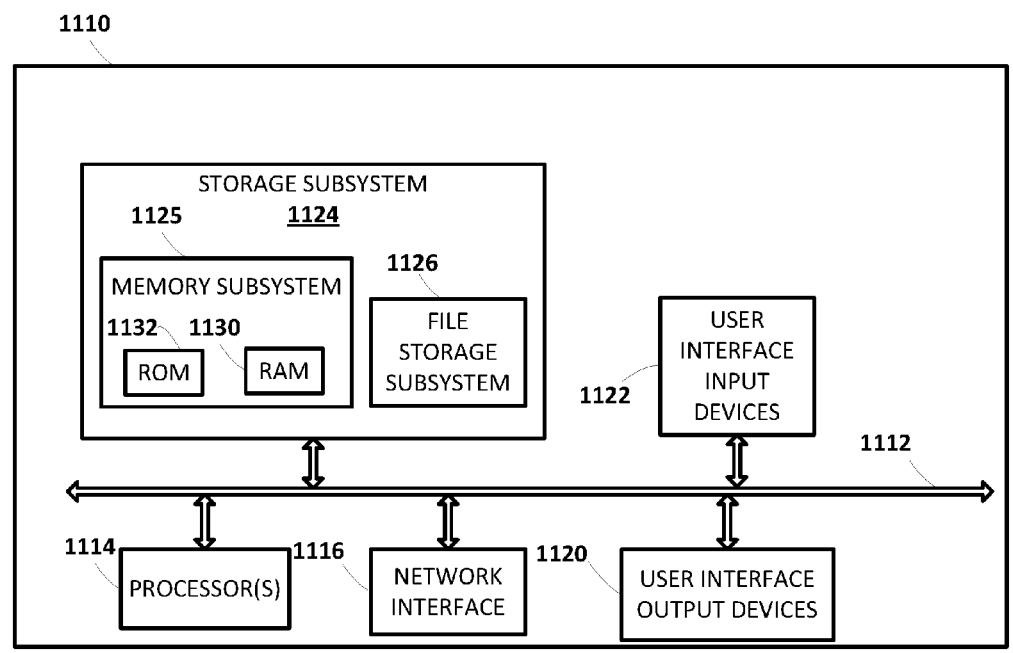
FIG. 11 schematically depicts an example architecture of a computer system.

FIG. 11 is a block diagram of an example computing device 1110 that may optionally be utilized to perform one or more aspects of techniques described herein. Computing device 1110 typically includes at least one processor 1114 which communicates with a number of peripheral devices via bus subsystem 1112. These peripheral devices may include a storage subsystem 1124, including, for example, a memory subsystem 1125 and a file storage subsystem 1126, user interface output devices 1120, user interface input devices 1122, and a network interface subsystem 1116. The input and output devices allow user interaction with computing device 1110. Network interface subsystem 1116 provides an interface to outside networks and is coupled to corresponding interface devices in other computing devices.

User interface input devices 1122 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1110 or onto a communication network.

User interface output devices 1120 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1110 to the user or to another machine or computing device.

Storage subsystem 1124 stores programming and data constructs that provide the functionality of some or all of the modules described herein. For example, the storage subsystem 1124 may include the logic to perform one or more aspects of the method of FIG. 7, the method of FIG. 8, and/or the method of FIG. 9.

These software modules are generally executed by processor 1114 alone or in combination with other processors. Memory 1125 used in the storage subsystem 1124 can include a number of memories including a main random access memory (RAM) 1130 for storage of instructions and data during program execution and a read only memory (ROM) 1132 in which fixed instructions are stored. A file storage subsystem 1126 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1126 in the storage subsystem 1124, or in other machines accessible by the processor(s) 1114.

Bus subsystem 1112 provides a mechanism for letting the various components and subsystems of computing device 1110 communicate with each other as intended. Although bus subsystem 1112 is shown schematically as a single bus, alternative implementations of the bus subsystem may use multiple busses.

Computing device 1110 can be of varying types including a workstation, server, computing cluster, blade server, server farm, or any other data processing system or computing device. Due to the ever-changing nature of computers and networks, the description of computing device 1110 depicted in FIG. 11 is intended only as a specific example for purposes of illustrating some implementations. Many other configurations of computing device 1110 are possible having more or fewer components than the computing device depicted in FIG. 11.

What is claimed is:

1. A method, comprising:
   capturing, by a camera sensor of a robot, a first image that captures at least a portion of an environment of the robot, the portion of the environment being captured in the first image from a first vantage and being captured through reflections of two or more mirrors;
   subsequent to capturing the first image, adjusting a mirror pose of at least a first mirror of the two or more mirrors, the adjusting being to an adjusted pose and the adjusting occurring independent of locomotion of the robot and independent of adjusting a camera sensor pose of the camera sensor;
   capturing, by the camera sensor of the robot when the first mirror is at the adjusted pose, a second image that captures at least the portion of the environment from a second vantage, the capturing from the second vantage being a result of adjusting the first mirror pose to the adjusted pose;
   determining at least one feature of the portion of the environment of the robot based on both the first image and the second image; and
   assigning, in one or more computer readable media, the feature to an identifier of the portion of the environment.

2. The method of claim 1, wherein the at least one feature is a depth feature and wherein determining the depth feature comprises:
   determining a first depth value based on one or more pixels of the first image and based on one or more corresponding pixels of a third image, the third image being captured at or near a first time at which the first image was captured;
   determining a second depth value based on one or more pixels of the second image and based on one or more corresponding pixels of a fourth image, the fourth image being captured at or near a second time at which the second image was captured; and
   determining the depth feature based on the first depth value and the second depth value.

3. The method of claim 2, wherein the corresponding pixels of the third image and the corresponding pixels of the fourth image are captured by a second camera sensor of the robot without mirror reflection.

4. The method of claim 2, wherein the third image and the fourth image are both captured at a third vantage.

5. The method of claim 4, wherein determining the depth feature based on the first depth value and the second depth value comprises:
   determining at least one initial depth value based on at least one of the first depth value and the second depth value;
   determining a first weight for the first depth value based on a first accuracy measure of the combination of the first vantage and the third vantage for the initial depth value;
   determining a second weight for the second depth value based on a second accuracy measure of the combination of the second vantage and the third vantage for the initial depth value; and
   determining the depth value based on the first depth value and the first weight, and based on the second depth value and the second weight.

6. The method of claim 1, wherein adjusting the mirror pose comprises:
   adjusting the mirror pose of the first mirror to the adjusted pose; and adjusting a second mirror pose of a second mirror, of the two or more mirrors, to a second adjusted pose.

7. The method of claim 6, wherein the second mirror is coupled to an adjustable arm of the robot, and wherein adjusting the second mirror pose of the second mirror to the second adjusted pose comprises:
actuating one or more actuators of the adjustable arm that dictate an adjustable arm pose of the adjustable arm and that dictate the second mirror pose of the second mirror.

8. The method of claim 6, further comprising:
determining the adjusted pose of the first mirror and the second adjusted pose of the second mirror;
determining the second vantage based on: the adjusted pose, the second adjusted pose, and the camera sensor pose at the time the second image was captured;
wherein determining the feature of the portion of the environment based on the second image comprises determining the feature based on the second vantage.

9. The method of claim 8, wherein determining the adjusted pose of the first mirror is based on sensor data from one or more sensors that indicate one or more positions of one or more actuators that dictate the mirror pose of the first mirror.

10. The method of claim 9, wherein the first mirror is coupled to an adjustable arm of the robot, wherein the actuators dictate an adjustable arm pose of the adjustable arm and dictate the first mirror pose of the first mirror, and wherein adjusting the first mirror pose of the first mirror to the adjusted pose comprises:
actuating the actuators of the adjustable arm.

11. The method of claim 1, further comprising:
determining, prior to adjusting the first mirror pose of the first mirror to the adjusted pose, that the adjusted pose enables capturing of the second image from the second vantage;
wherein the adjusting the mirror pose to the adjusted pose is in response to determining that the adjusted pose enables capturing of the second image from the second vantage.

12. The method of claim 1, wherein the at least one feature of the portion of the environment includes at least one of an edge feature, a color feature, a corner feature, a blob feature, and a depth feature.

13. A method, comprising:
capturing, by a camera sensor of a robot, a first image that captures at least a portion of an environment of the robot from a first vantage;
subsequent to capturing the first image, adjusting a camera sensor pose of the camera sensor or a mirror pose of at least one mirror in the field of view of the camera sensor, the adjusting being to an adjusted pose and the adjusting occurring independent of locomotion of the robot;
capturing, by the camera sensor of the robot when the camera sensor or the mirror are at the adjusted pose, a second image that captures at least the portion of the environment from a second vantage, the capturing from the second vantage being a result of adjusting the camera pose or the mirror pose to the adjusted pose;
determining at least one feature of the portion of the environment of the robot based on both the first image and the second image; and
assigning, in one or more computer readable media, the feature to an identifier of the portion of the environment.

14. The method of claim 13, wherein adjusting the camera pose or the mirror pose to the adjusted pose comprises adjusting the mirror pose of the mirror in the field of view of the camera sensor.

15. The method of claim 14, wherein the mirror in the field of view of the camera sensor is coupled to an adjustable arm of the robot, and wherein adjusting the mirror pose of the mirror to the adjusted pose comprises:
actuating one or more actuators of the adjustable arm that dictate an adjustable arm pose of the adjustable arm and that dictate the mirror pose of the mirror.

16. The method of claim 15, further comprising:
determining the adjusted pose of the mirror;
determining the second vantage based on the adjusted pose of the mirror and based on the camera sensor pose at a time the second image was captured;
wherein determining the feature of the portion of the environment based on the second image comprises determining the features based on the second vantage.

17. The method of claim 16, further comprising:
determining the adjusted pose of the mirror; and
determining that the portion of the environment present in the first image is also present in the second image based on the adjusted pose of the mirror;
wherein determining the feature of the portion of the environment of the robot based on both the first image and the second image is based on determining that the portion of the environment is present in the first image and the second image.

18. The method of claim 17, wherein determining the adjusted pose of the mirror is based on sensor data from one or more sensors that indicate positions of the actuators that dictate the mirror pose of the mirror.

19. The method of claim 13, wherein the identifier of the portion of the environment identifies a location of the portion of the environment in a map of the environment.

20. The method of claim 13, wherein the at least one feature is a depth feature and wherein determining the depth feature comprises:
determining a first depth value based on one or more pixels of the first image and based on one or more corresponding pixels of a third image, the third image being captured at or near a first time at which the first image was captured;
determining a second depth value based on one or more pixels of the second image and based on one or more corresponding pixels of a fourth image, the fourth image being captured at or near a second time at which the second image was captured; and
determining the depth feature based on the first depth value and the second depth value.

21. A method, comprising:
capturing, by a camera sensor of a robot, a first image that captures at least a portion of an environment of the robot from a first vantage;
subsequent to capturing the first image, adjusting a mirror to an adjusted mirror pose, the mirror being coupled to an adjustable arm of the robot, and the mirror at the adjusted mirror pose being in the field of view of the camera sensor, wherein adjusting the mirror pose to the adjusted mirror pose comprises:
actuating one or more actuators of the adjustable arm that dictate an adjustable arm pose of the adjustable arm and that dictate the mirror pose of the mirror;
capturing, by the camera sensor of the robot when the mirror is at the adjusted pose, a second image that captures, through the mirror, at least the portion of the environment from a second vantage;

determining at least one feature of the portion of the environment of the robot based on both the first image and the second image; and assigning, in one or more computer readable media, the feature to an identifier of the portion of the environment.

\* \* \* \* \*